(No Model.)
J. A. FULTON.
FILTER.
No. 454,340. Patented June 16, 1891.
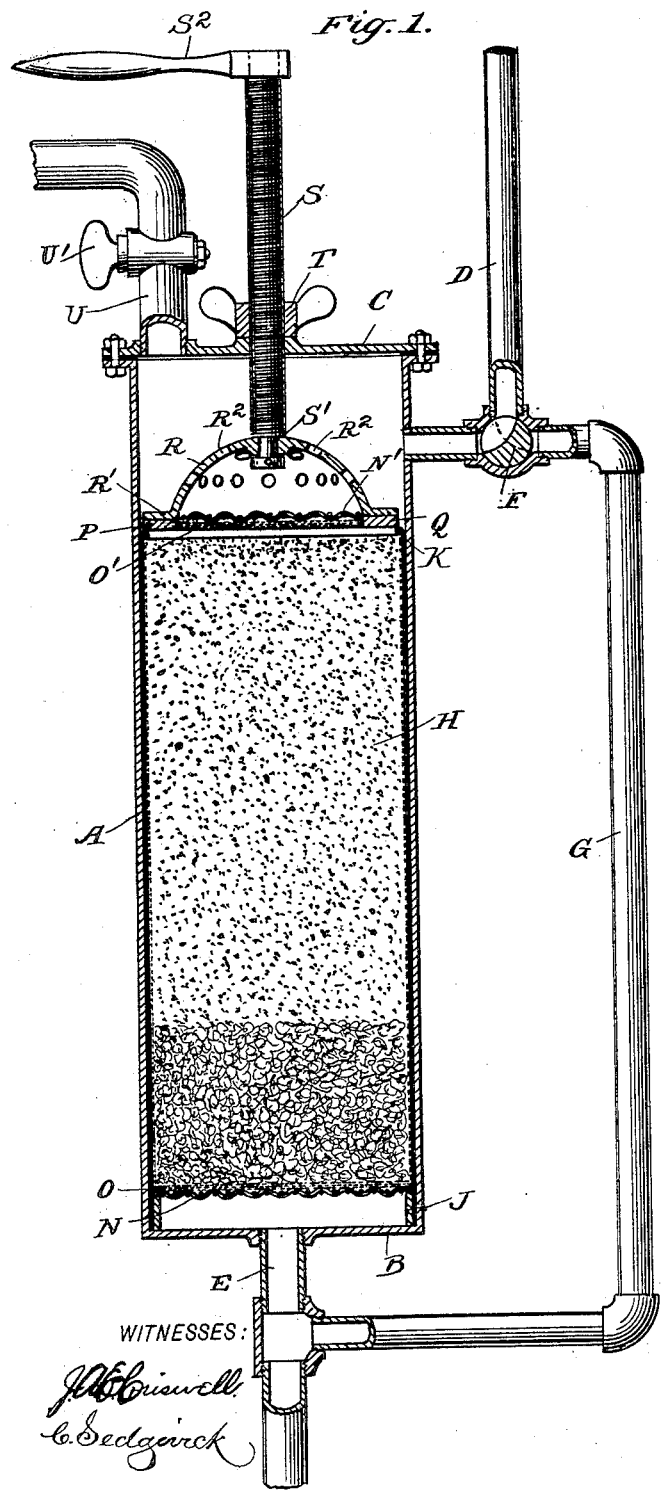
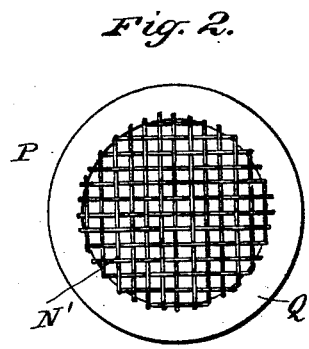
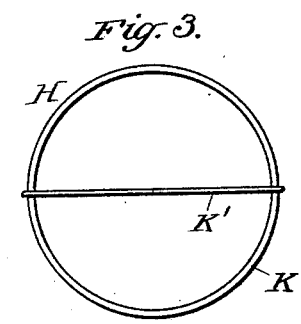
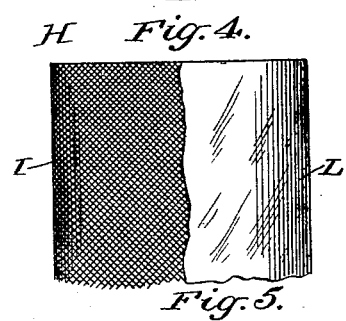
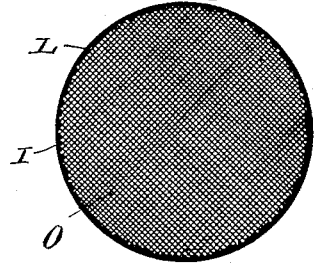
INVENTOR:
J. A. Fulton
BY Munn & Co
ATTORNEYS

UNITED STATES PATENT OFFICE.

JACOB A. FULTON, OF ASTORIA, OREGON.

FILTER.

SPECIFICATION forming part of Letters Patent No. 454,340, dated June 16, 1891.

Application filed February 18, 1891. Serial No. 381,932. (No model.)

*To all whom it may concern:*

Be it known that I, JACOB A. FULTON, of Astoria, in the county of Clatsop and State of Oregon, have invented a new and Improved Filter, of which the following is a full, clear, and exact description.

This invention is an improvement in the class of filters in which the filtering material is contained in a suitable bag.

Reference is to be had to the accompanying drawings, forming a part of this specification, in which similar letters of reference indicate corresponding parts in all the figures.

Figure 1 is a sectional side elevation of the improvement. Fig. 2 is a plan view of the perforated cover. Fig. 3 is a plan view of the filtering-bag. Fig. 4 is a side elevation of the same with part removed, and Fig. 5 is a sectional plan view of the same.

The improved filter is provided with a casing A, preferably made in cylindrical shape, and closed at its ends by the heads B and C, of which the head B is preferably rigidly formed on the casing A, while the other head C is secured to the casing by bolts or other suitable means. The casing A may be placed in a vertical or horizontal position, as desired.

Into the end of the casing A, near the head C, opens the water-inlet pipe D, connected with the source of water-supply and provided with a two-way cock F, adapted to cut off the pipe D from the casing A and to connect the said pipe with a pipe G, leading to the outlet-pipe E, arranged in the head B and opening into the lower end of the casing A. The pipe G is used for cleaning the filter, as hereinafter more fully described.

Within the casing A is fitted a filtering-bag H, provided with a cylindrical shell I, made of wire-gauze and fastened at its lower end onto a ring J, set edgewise and resting on the inside of the head B. The upper end of the shell I is provided with a wire rim K, supporting a bail K', for conveniently removing the bag from the casing A whenever desired. The shell I is incased in a canvas covering L, which serves to form a packing for the shell I to prevent the water from passing down on the sides of the casing A, instead of through the filtering material contained within the shell I.

On the top of the ring J rests the bottom of the bag H, the said bottom being composed of a strong wire-netting N, supporting on top one or more layers O of fine wire-gauze, so that the water has to pass through the meshes in the said gauze before passing into the space formed in the lower end of the casing A above the head B. On the wire rim K on the upper end of the shell I is supported a cover P, similar to the bottom previously described, and consisting of a flat ring Q, on top of which is secured the coarse wire-netting N', similar to the netting N of the bottom, and on the other side of this wire-netting N' are secured one or more layers O' of fine wire-gauze.

On the upper end of the filter-bag H is adapted to press a plunger R, preferably made semi-spherical and formed with an outer rim R', fitting onto the top of the ring Q. In the plunger R are produced perforations $R^2$, which permit the water entering the pipe D to pass through the said perforations onto the cover P and through the wire-netting N' and the layers of wire-gauze O' into the filtering material contained in the bag. The plunger R is adapted to be pressed onto the filtering-bag H by means of a screw S, screwing in the head C and having its lower somewhat reduced end S' mounted to turn loosely in the plunger R. On the outer end of the screw S is arranged a handle $S^2$ for conveniently turning the said screw, so as to press the plunger R with more or less force onto the upper end of the filtering-bag H. A thumb-nut T screws on the screw S on the outside of the head C, so as to lock the said screw-rod in place after the plunger is adjusted, at the same time preventing leakage through the threads in the head C. In the head C is also held a discharge-pipe U, provided with a valve U' and serving to discharge the water when the filter is cleaned.

The device is used as follows: The filtering-bag H is filled in its lower part with charcoal, and the balance of the bag is filled with fine sand, which extends up to the rim K. The bag is placed in the casing A, so that its ring J rests on the head B, thereby forming a space in the lower end of the casing A between the said head B and the bottom of the bag to permit the filtered water to readily flow into the outlet-pipe E. When the bag is in place in the casing, the cover is put on top, and then the plunger R is inserted with the head C, which latter is fastened to the end of the casing. The water from the water-supply pipe D is now passed into the casing A to flow through the perforated plunger R and the cover into and through the filtering material contained in the bag H. The water in passing through the filtering material is freed from impurities which remain in the filtering material, while the purified water flows through the bottom of the bag into the lower end of the casing and out through the outlet-pipe E. The speed with which the water can pass through the filtering material can be easily regulated by the operator pressing the plunger R with more or less force onto the upper end of the bag H, so as to compress the filtering material with more or less power, whereby the water flows more or less freely through the filtering material in the bag. It is understood that when the plunger R is pressed very hard onto the filtering material the latter is considerably compressed, so that the flow of water through the bag is very slow, and hence the water is purified to a greater degree.

When it is desired to clean the filter, the operator turns the two-way cock F, so as to disconnect the pipe E from the casing A and connect the pipes E and G with each other. The water from the water-supply pipe D passes through the pipe G into the outlet-pipe E and into the lower end of the casing A to pass through the filtering material, thereby washing out the impurities, which pass with the water through the cover into the upper end of the casing A and out through the pipe U.

In order to successfully wash the filter, all pressure is removed from the bag, the screw-rod being screwed outward to take the plunger off the bag. It is also desirable to use hot water in washing out the impurities lodged in the bag. For this purpose a suitable connection is made on pipe E or G with source of hot water.

Having thus fully described my invention, I claim as new and desire to secure by Letters Patent—

1. In a filter, the combination, with a casing provided with an inlet and an outlet, of a filtering-bag containing the filtering material and composed of a shell of wire-gauze, a canvas covering arranged around the said shell, a ring secured in the lower end of the said shell, and a cover and bottom arranged on the ends of the said shell and each provided with a coarse wire-netting and layers of fine wire-gauze, substantially as shown and described.

2. In a filter, a filtering-bag comprising a shell of fine wire-gauze, a canvas covering surrounding the said shell, a ring secured in one end of the said shell and supporting the bottom, formed of a wire-netting and layers of fine wire-gauze, and a filtering material held in the said shell and supported on the said bottom, substantially as shown and described.

3. In a filter, a filtering-bag comprising a shell of fine wire-gauze, a canvas covering surrounding the said shell, a ring secured in one end of the said shell and supporting the bottom, formed of a wire-netting and layers of fine wire-gauze, a filtering material held in the said shell and supported on the said bottom, and a cover held on the upper end of the said shell and provided with a ring, a wire-netting, and layers of fine wire-gauze, substantially as shown and described.

JACOB A. FULTON.

Witnesses:
G. C. FULTON,
A. L. FULTON.